Oct. 24, 1950     J. ODEGAARD     2,527,442
CABLE OR WIRE PLASTIC SECURING DEVICE
Filed April 1, 1949
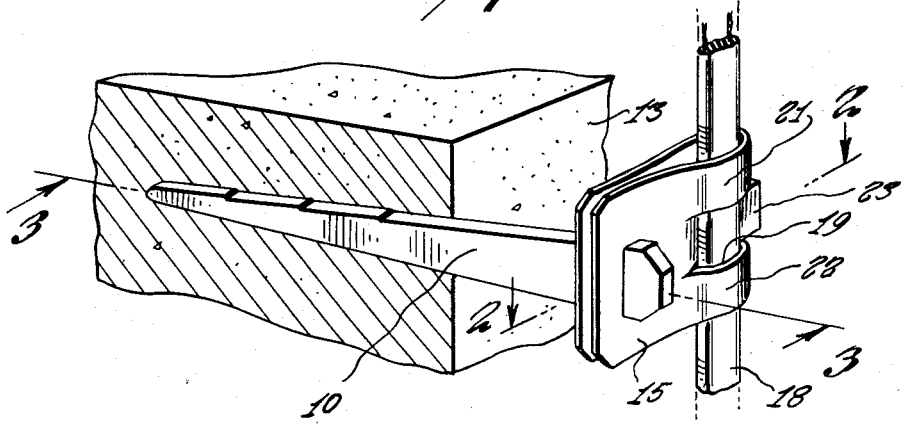
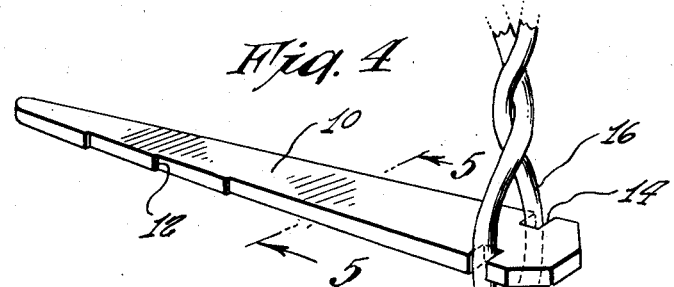
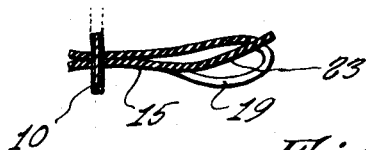
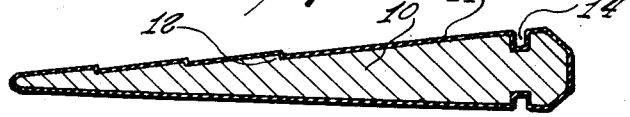
INVENTOR.
JOHN ODEGAARD
BY Carl Miller
ATTORNY Patented Oct. 24, 1950

2,527,442

UNITED STATES PATENT OFFICE 2,527,442

CABLE OR WIRE PLASTIC SECURING DEVICE

John Odegaard, Brooklyn, N. Y.

Application April 1, 1949, Serial No. 84,819

1 Claim. (Cl. 174—159)

This invention relates to a cable or wire securing device.

It is an object of the present invention to provide a cable or wire securing device which can be formed of plastic materials and of a flexible nature so that the fixing of the cable upon a nail support can be effected with dispatch and without the same being subject to easy removal from the nail and wherein the securing parts themselves will be of insulating material.

Other objects of the present invention are to provide a plastic cable or wire securing device which is of simple construction, inexpensive to manufacture, easy to attach and detach upon a nail support, compact and of minimum parts and efficient in operation.

For other objects and for a better understanding of the invention, reference may be had to the following detailed description taken in connection with the accompanying drawing, in which Fig. 1 is a perspective view of the insulating member connecting the cable to a nail support located in a wall and embodying the features of the present invention.

Fig. 2 is a transverse sectional view taken on line 2—2 of Fig. 1.

Fig. 3 is a longitudinal sectional view taken on line 3—3 of Fig. 1 and showing a nail support which has been coated with insulation.

Fig. 4 is a perspective view of a twisted wire supported upon the insulated nail support.

Fig. 5 is a transverse sectional view taken on line 5—5 of Fig. 4.

Fig. 6 is a perspective view of the flexible plastic attaching member used in Fig. 1.

Referring now to the figures, 10 represents a supporting spike which is coated with insulation 11 of hard rubber, hard plastic or any other suitable insulation material. This nail is notched, as indicated at 12, in order to prevent the easy removal of the same when it has been driven into wall concrete 13. This nail is notched at the opposite side edges, as indicated at 14, to receive a flexible plastic clip 15, as shown in Fig. 1, or twisted cable strands 16. The clip 15 is made of plastic material which is flexible and has openings 17 on the opposite ends of the same which can be aligned with one another to provide a loop which surrounds cable 18. The openings 17 are made undersize so that they can be stretched slightly in order to prevent any slippage of the clip 15 from the nail slots. The openings can be stretched slightly when the same is applied to the nail. The clip is wrapped about the cable 18 with sufficient tightness as to prevent any slippage of the cable therethrough.

The clip has an opening 19 to provide upper and lower narrow width portions 21 and 22 in order to allow for the stretching of the clip about the cable. A tongue 23 can be interposed between the central portion of the clip and the cable to provide further tightness of the cable within the clip.

Since the nail has an insulated coating thereon and the notches 14 are also insulated, a cable having strands 16 can be accommodated. The turns of the twisted cable are spread only sufficiently to allow the passage of the head of the spike therethrough and the strands are sufficiently interlocked to cause them to enter the notches and be retained therewithin.

While various changes may be made in the detail construction, it shall be understood that such changes shall be within the spirit and scope of the present invention as defined by the appended claim.

Having thus set forth and disclosed the nature of my invention, what is claimed is:

A cable or wire securing device comprising a spike or the like adapted to be secured to a supporting wall, a clip formed of a strip of flexible insulating material, said spike having a recess therein, said strip material adapted to be folded about a cable and having openings in opposite ends of the same adapted to receive the end of the spike to locate the clip within the recess of the nail, and said clip having an opening dividing the same into weakened portions to permit the stretching of the clip about the cable and a tongue portion extensible beneath the cable to provide for added tightness about the cable upon the clip being wrapped thereabout.

JOHN ODEGAARD.

REFERENCES CITED

The following references are of record in the file of this patent:

UNITED STATES PATENTS

| Number | Name | Date |
|---|---|---|
| 6,779 | Livingston et al. | Oct. 9, 1849 |
| 301,446 | Hale | July 1, 1884 |
| 1,055,046 | Jansson | Mar. 4, 1913 |
| 1,755,971 | Smalley | Apr. 22, 1930 |
| 2,323,362 | Weiss | July 6, 1943 |
| 2,438,419 | Schmidt | Mar. 23, 1948 |

OTHER REFERENCES

Strong, Procedures in Experimental Physics (1942), page 170. (Copy in Division 5.)